United States Patent
Avinash et al.

(10) Patent No.: US 8,068,652 B2
(45) Date of Patent: Nov. 29, 2011

(54) SEMI-AUTOMATED REGISTRATION OF DATA BASED ON A HIERARCHICAL MESH

(75) Inventors: Gopal Biligeri Avinash, New Berlin, WI (US); Patrick Michael Virtue, Waukesha, WI (US)

(73) Assignee: General Electric Company, Schenectady, NY (US)

( * ) Notice: Subject to any disclaimer, the term of this patent is extended or adjusted under 35 U.S.C. 154(b) by 698 days.

(21) Appl. No.: 12/201,442

(22) Filed: Aug. 29, 2008

(65) Prior Publication Data

US 2010/0054630 A1    Mar. 4, 2010

(51) Int. Cl.
*G06K 9/00* (2006.01)
*G06K 9/32* (2006.01)

(52) U.S. Cl. ........................... 382/128; 382/294

(58) Field of Classification Search ................ 382/294, 382/128

See application file for complete search history.

(56) References Cited

U.S. PATENT DOCUMENTS

| | | | |
|---|---|---|---|
| 6,901,277 B2 * | 5/2005 | Kaufman et al. | 600/407 |
| 7,693,349 B2 * | 4/2010 | Gering | 382/294 |
| 7,778,490 B2 * | 8/2010 | Quist | 382/294 |
| 2007/0280556 A1 * | 12/2007 | Mullick et al. | 382/294 |

OTHER PUBLICATIONS

Likar, et al., "A hierarchical approach to elastic registration based on mutual information," Image and Vision Computing 19 (2001) 21-44.*

* cited by examiner

*Primary Examiner* — Rodney Fuller
(74) *Attorney, Agent, or Firm* — Fletcher Yoder, P.C.

(57) ABSTRACT

A registration image is aligned or registered with a reference image by user interaction. The registration image is segmented into a hierarchy of elements defining a mesh having more than one level. At each level, individual elements may be selected by the user, translated, rotated and scaled with respect to the remainder of the registration image and to the reference image. Refinement of the user registration is facilitated by allowing the user to define further levels in the segmentation where each of the elements at the further levels may be separately manipulated in a similar manner. Interpolation may be performed between the moved or altered elements and between the elements and the remainder of the registration image to obtain a more satisfactorily registered image. The technique may be used with other interpolation and registration processes.

26 Claims, 6 Drawing Sheets

SEMI-AUTOMATED REGISTRATION OF DATA BASED ON A HIERARCHICAL MESH

BACKGROUND

The present invention relates generally to image processing systems and techniques, and more particularly to an interactive registration technique for aligning images based upon a division of at least one of the images into a hierarchical meshed segmentation.

Many imaging systems and techniques are known and are currently used in different arts. For example, in medical imaging, various modalities of imaging systems may be employed for creating useful images of anatomies, abnormalities, lesions, aneurysms, atrophies, and so forth. In general, such imaging systems operate in accordance with a particular physical effect and gather image data which can be processed to create useful images. Most modern modalities for such imaging systems are based upon collection of digital data which is processed and stored, and which may be manipulated by various post-processing techniques. In the medical field, for example, such imaging systems include X-ray systems, computed tomography systems, magnetic resonance imaging systems, positron emission tomography systems, ultrasound systems, and so forth. These and other modalities of digital imaging system exist in other arts, particularly in industrial inspection, package and baggage inspection, defense applications, and so forth.

In the medical field, many clinical decisions are made based upon or derived from analysis information available from one or more image dataset. In the radiology domain, for example, this typically involves spatially registering the datasets such that the areas of interest are aligned. From a practical standpoint, images are analyzed either by manual reading, by analysis through automated algorithms, or a combination of these techniques. To permit comparison and contrast of images, alignment or registration of the images is often in order. That is, because the images may be made on different subjects, or at different times on the same subject, as well as on different imaging modalities, characteristics, anatomies, features and so forth visible in the images may not be properly aligned with one another. Image registration can present extremely difficult mathematical problems involved in moving or altering one or both images to be compared, while respecting the integrity of the data so as to avoid confusion or misinterpretation. It should be borne in mind that these problems are presented not only in the medical field, but in any other field in which image registration is performed.

By way of example, in medical image analysis, referring physicians often request that images to be made and interpreted for a specific purpose. Such purposes can range from the detection, assessment, analysis of progression or regression of various abnormalities or disease states. Multiple datasets for images may be used for comparison purposes, such as with and without contrast agents, or for the analysis of changes overtime, or still further for combination with certain functional datasets. Many of these comparisons and contrasts are made based upon changes within a single patient overtime although similar comparisons can be made between patients, or between a standard or reference image, sometimes referred to as in "atlas" image, and an image for a specific patient. To perform the necessary analysis using multiple datasets, the datasets must first be accurately and robustly registered. Here again, applications outside of the medical field requiring alignment or comparison of an image or a feature within an image with a standard or reference feature often sesitates a similar registration process.

While many context-specific algorithms that exist, the purpose of which is to register multiple datasets, the variability in virtually all sources of image data results in no particular algorithm functioning exactly as desired for all registration problems. Moreover, factors, such as scaling, noise, motion, partial voluming, and so forth may create artifacts that hamper the accuracy and precision of registration algorithms.

In many practical applications, the main issue with results obtained from a registration algorithm is not whether it is accurate based upon a numerical criterion, but rather how a human user, who is the final arbiter in the matter, perceives it. Furthermore, there is generally a need "correct" the registration results based upon the numerical criteria employed. Such corrections are not easily achieved by manual registration techniques. Such techniques commonly permit a human technician to provide points, lines, services, volumes and so forth before the registration process. Interactive registration methods involving global transforms also fall short of user expectation. In all such cases there is a need to provide a flexible yet intuitive tool to a human user to facilitate speedy registration, which may be supplemented by machine computation.

BRIEF DESCRIPTION

The present invention provides a method for registering a digital image with a reference. The method includes accessing a reference image and a registration image, the registration image being segmented into at least 2 hierarchical levels. A user selection is then received of a segmentation level, followed by displaying at least one segmented element of the reference image in accordance with the selected segmentation level. A further user selection is received of a segmented element at the selected level, as well as an input for alteration of the registration image by modification of the selected element. The altered registration image is stored, including the modified selected element.

The invention also provides a method for registering a digital image with a reference that includes accessing a reference image and a registration image, the registration image being segmented into at least 2 hierarchical levels, receiving a user selection of a segmentation level, and displaying at least one segmented element of the reference image in accordance with the selected segmentation level. The method also includes receiving a user selection of a segmented element at the selected level, and receiving user input for alteration of the registration image by translation, rotation or scaling of the selected element, the user being able to perform any or all of translation, rotation and scaling of the selected element. Steps (b) through (e) are repeated for different segmentation levels. Finally, the altered registration image is stored including the modified selected element.

The invention also provides a system for registering a digital image with a reference that includes a digital storage device for storing a reference image and a registration image, the registration image being segmented into at least 2 hierarchical levels. Processing circuitry is provided that is configured to access the reference and registration images, to receive a user selection of a segmentation level, a user selection of a segmented element at the selected level, and user inputs for alteration of the registration image by modification of the selected element. The processing circuitry alters the registration image based upon user modification of the selected element at the selected level. A display device is coupled to the processing circuitry and configured to display the reference image, the registration image, the selected element at the selected segmentation level, and the altered registration image as the user inputs are made.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
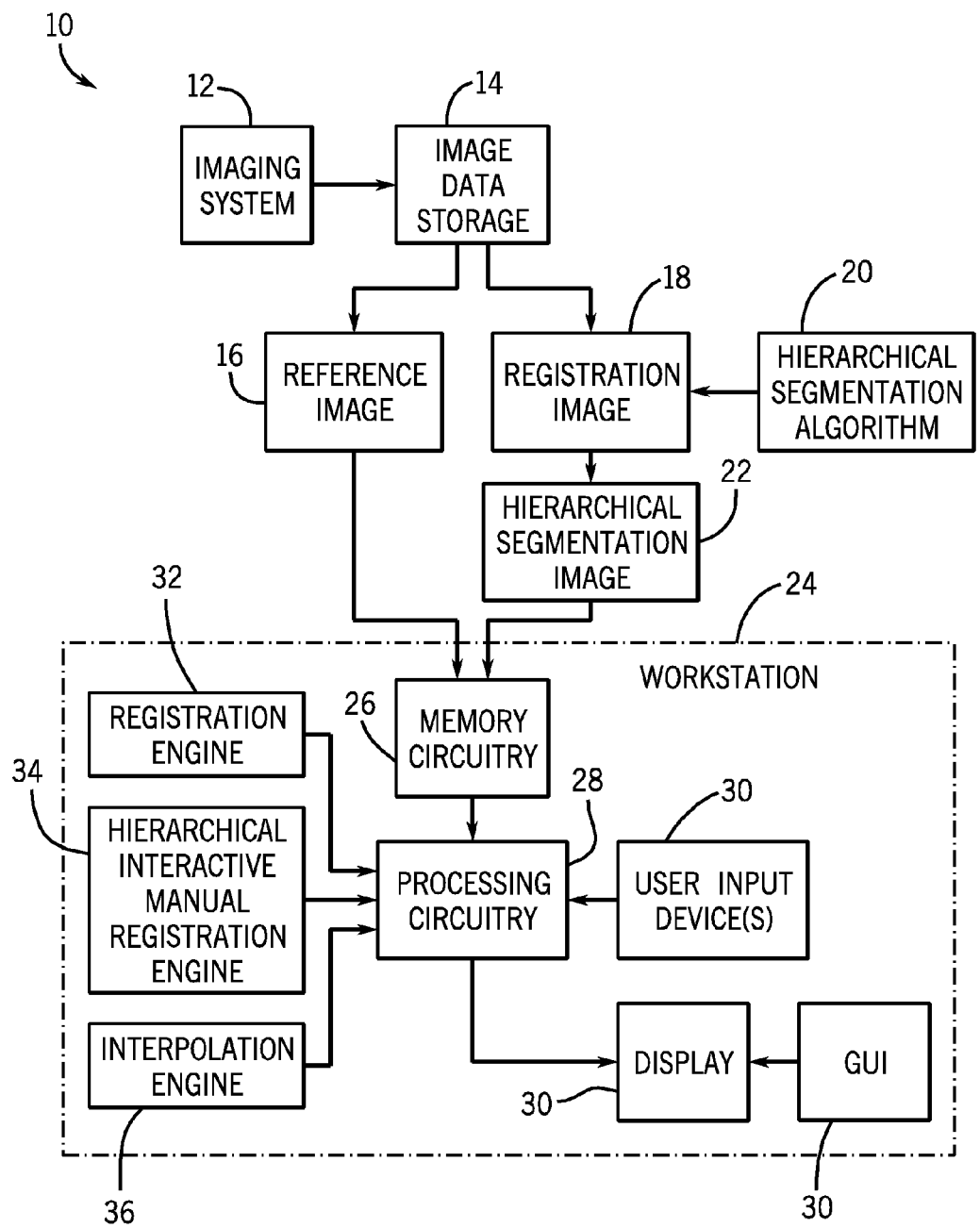
FIG. 1 is a diagrammatical overview of an image processing system in accordance with the present technique that allows interactive registration based upon hierarchical segmentation of at least one image to be registered.

Turning now to the drawings, and referring first to FIG. 1, an image processing system 10 is illustrated diagrammatically that is adapted for permitting interactive registration or alignment of images in accordance with a hierarchical segmentation of one or both the images to be registered. The image processing system 10 generally includes an imaging system 12 at and an image data storage device 14. As will be appreciated by those skilled in the art, depending upon the application and context in which they are utilized, the imaging system 12 may include a wide range of imaging devices and modalities. For example, in the medical diagnostic imaging context, the system may be based on any known imaging physics, such as radiography systems (X-ray, computer tomography, tomosynthesis, fluoroscopy), magnetic resonance imaging, positron emission tomography imaging, ultrasound imaging, and so forth. Indeed, the system may include a combination of such modalities, and as described below images produced on different modalities or on the same modality system over period of time may be aligned, registered and compared. In other contexts, such as baggage and parcel inspection, security inspection, industrial park inspection, and so forth, similar technologies may be employed. It should be noted that, as described below, the images produced and the comparisons made may be between an image made via the imaging system 12 and another image made on the same or a different imaging system, while other comparisons may be made between an image produced on the system 12 and a general reference image. For example, reference images may include images from a reference library indicating a "normal" or typical feature of interest. Similar reference images may comprise composites of more than one, and in some cases many reference images that, together, represent a reference for a particular reason of interest, feature, anatomy, abnormality, and so forth. Such reference images are sometimes referred to as atlas images.

The imaging system 12 produces, ultimately, a digital image made up of an array of discrete pixel elements or pixels, each encoded by a value representing a grey scale or color. The discretized pixel values may be produced directly by the imaging system 12 or the imaging system may use a scanner or other digitizing device to convert an analog image (e.g., on film) to a digitized image. The digitized image is conventionally stored in a known file format, such as in accordance with DICOM standards in the medical diagnostics field. Such files will typically include not only the image data, but reference information relating to the date it was produced, the subject imaged in the data, the system on which the image was produced, and so forth.

These data files are then stored in the image data storage device 14. The storage device may be integral to the imaging system 12, or may be separate from the imaging system, in some cases completely remote from the imaging system. For example, in a medical diagnostics context, such storage devices may include a picture archiving and communication system (PACS) that collects images from system within a hospital, clinic, or an entire system of hospitals or clinics. The images may be retrieved and conveyed to a workstation as described below for post-processing, reading by technicians and specialists (e.g., radiologists in the medical context) and so forth. The image data may also be compressed within the storage device in accordance with generally known compression techniques. In such cases, the image data will typically be conveyed to the workstation in the compressed form and later decompressed to the best use of both storage capabilities and bandwidth.

The system 10 provides for alignment, registration and comparison of images by allowing for retrieval of the image data from the image data storage device 14. In the embodiment illustrated in FIG. 1, for example, a reference image 16 may be retrieved as well as a registration image 18. For alignment purposes, it should be understood that one or both of the images to be registered may be altered. That is, because the images will typically not precisely lie one on top of the other in terms of the regions or features of interest, some alteration in the contour, shape, position, scale and so forth of features within one or both images requires adaptation to correspond to the location of similar regions or features within the other image. While the present technique does permit two (or more) images to be altered in this way, for convenience sake the present discussion treats one image as essentially fixed, referred to as the reference image 16, while the other image is subject to modification or movement, referred to herein as the registration image 18. It should also be noted that while the reference image is illustrated as being drawn from the image data storage device 14, where atlas images, general reference images, library images and so forth are used for comparison purposes, these may be stored in other locations, including locations accessed by the user via an internal or external network, over the Internet, from subscription services, and so forth. Again, the reference image may correspond to the registration image in various ways, perhaps more typically the two images will be made of the same patient at different periods in time in order to study the changes in any regions or features of interest over time. Such studies may document, for example, the onset or progression of a disease state, the response of the disease state to treatment, and so forth. In other applications, comparisons can be made between images of a subject and similar images of a different subject. In contexts outside of medical imaging field, comparisons may similarly be made between objects detectable in the registration image (e.g., a face, an article enclosed in a package, a feature, profile or potential defect in an article of manufacture) and a known profile for such features.

As illustrated in FIG. 1, a hierarchical segmentation algorithm 20 is applied to the registration image 18 as described more fully below. In general, the hierarchical segmentation algorithm will subdivide the registration image into levels of segmented elements or portions. Such segmentation may be performed in the imaging system 12, or in post-processing in a workstation in which the registration and comparison are made, or prior to such registration and comparison. Indeed, the image itself may be stored in an integral (non-segmented) format and/or in the segmented format. As also described below, such segmentation may divide the registration image into elements of a predetermined shape and size, or according to detection of specific features. In a particular embodiment described below, for example, the image may be segmented into different levels of rectangular or square elements. However, more feature-specific segmentation may be performed in which the hierarchical segmentation follows particular anatomies or structures identifiable in the registration image (e.g., regions of the body, organs, portions of organs, etc.).

Ultimately, the reference image 16 and the hierarchical segmented image 22 are available to a user via a workstation 24. The workstation 24 is illustrated to include memory circuitry 26 and processing circuitry 28. As will be appreciated by those skilled in the art, the workstation will perform potentially complex image data manipulation, and will thus typically be a capable programmed computer, such as a general purpose personal computer, an application-specific workstation for image processing, and so forth. Moreover, although not illustrated in FIG. 1, the workstation will include interface circuitry for communicating with the image data storage device 14 and/or the image system 12 such that the reference image 16 and registration image 18 can be accessed, downloaded and processed. In general, however, the segmented image 22 and reference image 16 are ultimately stored in the memory circuit 26, along with application code for the processing circuitry 28. The workstation will also include interface circuitry, such as a modem or the like permitting the workstation to communicate either of these images, or the results of the registration process to other computers, other workstations, storage devices, referring physicians, industrial engineers and designers in industrial context, and so forth.

The workstation is specifically designed to permit an interactive process of registration of the images as described below. This process enables the user to overlay two or more images and to align the images in a very intuitive manner based upon movement and scaling of segmented elements at the various levels. To facilitate such interaction, the workstation includes a user interface devices 30, including a display, a graphical user interface and user input devices. The display may include any suitable computer screen, typically having a resolution sufficient to permit adequate viewing alignment and discernment of the images by the user. The graphical user interface is actually part of an application program that permits the overlay and movement and scaling of the images on the display. As described below, the graphical user interface will allow the user to select a level of segmentation, to manipulate segmented elements, and then to perform interpolation to reconstruct an altered image based upon the movement of the elements by the user. The user makes such changes via the user input devices which will typically include a conventional keyboard, mouse, or any other input devices that facilitate such selection and alteration of the segmented image.

A registration engine 32 will generally provided to perform automated or semi-automated registration of the images. Various application programs may be used for the registration engine, including algorithms for registration by warping, splines, or any other known technique. A hierarchical interactive manual registration engine 34 will also be provided including logic for permitting user-interactive registration as described more fully below. An interpolation engine 36 may be part of the application program that permits the registration process. The interpolation engine may be based upon known interpolation schemes, typically that alter pixel values or intensities in both moved elements and the elements adjacent to the moved elements to smoothly stretch, shrink or otherwise alter the pixels affected by an element movement. Such interpolation may be performed after movement of elements as describe below. Ultimately, the processing circuitry will accept changes made by the user, interpolate or reconstruct the segmented image in accordance with such movement, and store the reconstructed image, or a combination of the reconstructed image and the reference image in a combined file. The storage may be made in the memory circuitry 26 or in other remote memory devices, such as the image data storage device 14.

Figure 2:
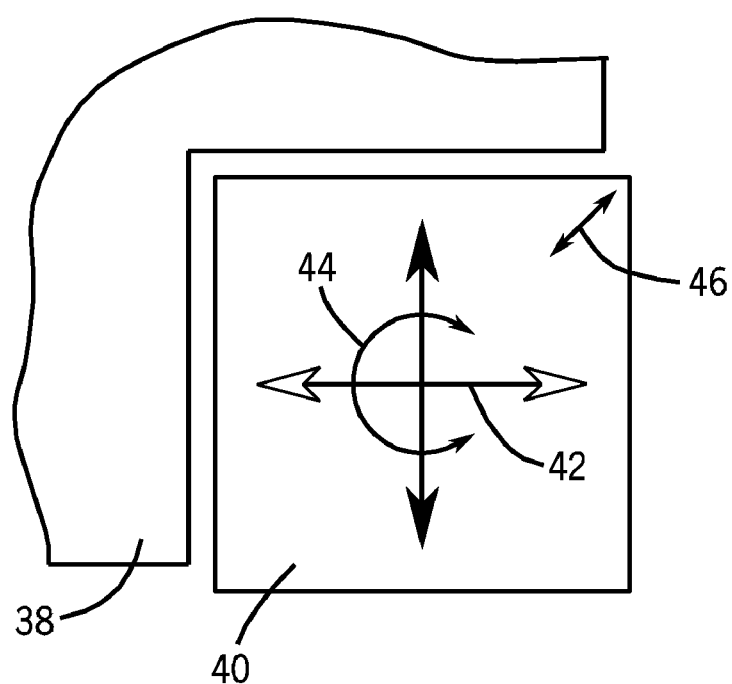
FIG. 2 is a diagrammatical view of an element of an image at a first level in a hierarchical segmentation, and degrees of freedom for manipulation of the element in accordance with aspects of the present technique.
Figure 3:
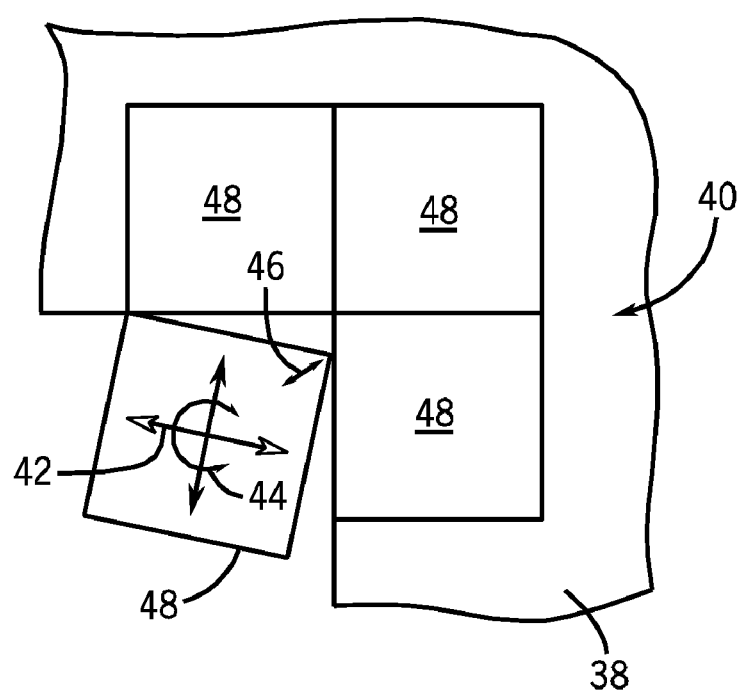
FIG. 3 is a similar representation of an element at a more refined hierarchical level, in which an element may be further manipulated.
Figure 4:
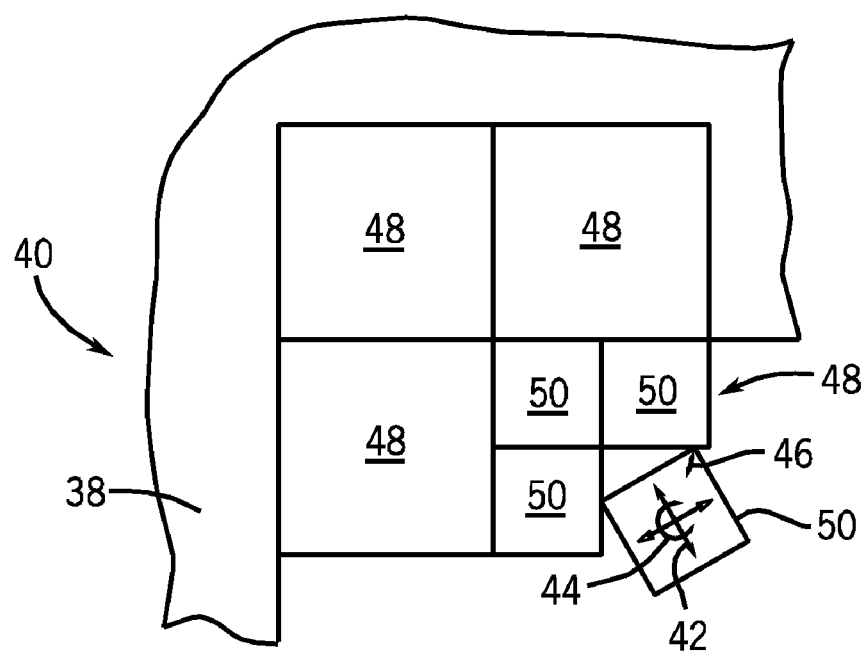
FIG. 4 is a similar diagram of manipulation of an element at a further level of refinement.

FIGS. 2, 3 and 4 illustrate a simplified segmented image at different levels of segmentation, as well as the degrees of freedom for movement of the elements of the image. In particular, as shown in FIG. 2, an image 38, again made of an array of pixels defined by digital values corresponding to grey levels or color, will be broken down into a series or a mesh of hierarchical elements. A first level is illustrated in FIG. 2 including an element 40. The element will, initially, be attached to the rest of the image, and may be surrounded by similar elements. It should be noted, again, that although a square element is illustrated in FIG. 2, the element could be and follow contours of a particular feature of interest, such as an organ, tissues, and so forth. In such contexts, the element may or may not be surrounded by similar elements. In this manner, a user could move an entire feature to align that feature with similar features or other features in a reference image (e.g., bone tissue, the heart, lungs, liver, brain, etc.). The first level element 40 is shown in FIG. 2 as being somewhat displaced from the neighboring portion of the image 38. As illustrated diagrammatically in FIG. 2, several degrees of freedom of movement are presently envisaged. These include translation as indicated by the arrows 42, rotation as indicated by reference numeral 44, and scaling as indicated by reference numeral 46. Translation may occur by movement of the entire element up, down, or to either side. Rotation, on the other hand, will typically rotate the entire element, while maintaining the relationship of all pixels within the element to one another at least prior to interpolation. Scaling will similarly maintain all relationships within the element, but may change the digital values of certain pixels, or may alter the number of pixels within the element. Again, the present technique may employ translation, rotation and interpolation calculations generally known in the art.

FIG. 3 represents segmented elements of the same image, and of the same element 40 at a greater degree of refinement or specificity. In this case, the element 40 was broken into four similar elements 48. Here each of the elements at this second level of segmentation may be independently selected and moved in a manner similar to that of element 40 described above. Thus, similar translation, rotation and scaling operations may be performed on each element 48 as indicated by reference numerals 42, 44 and 46, respectively.

FIG. 4 represents a further level of segmentation and movement of segmented elements. In this case, not only is the first level of segmentation element 40 subdivided into second level segmentation elements 48, but each element 48 may be subdivided into third level elements 50. Each of these elements 50 may be, as before, independently translated, rotated and scaled as indicated by reference numerals 42, 44 and 46. Similar segmentation, with the ability to manipulate elements at various levels may occur to even further levels of refinement. Indeed, for higher levels the entire image itself may be translated, rotated and scaled. Thereafter, increasingly refined or smaller elements may be defined, depending upon the level of flexibility and resolution desired.

Figure 5:
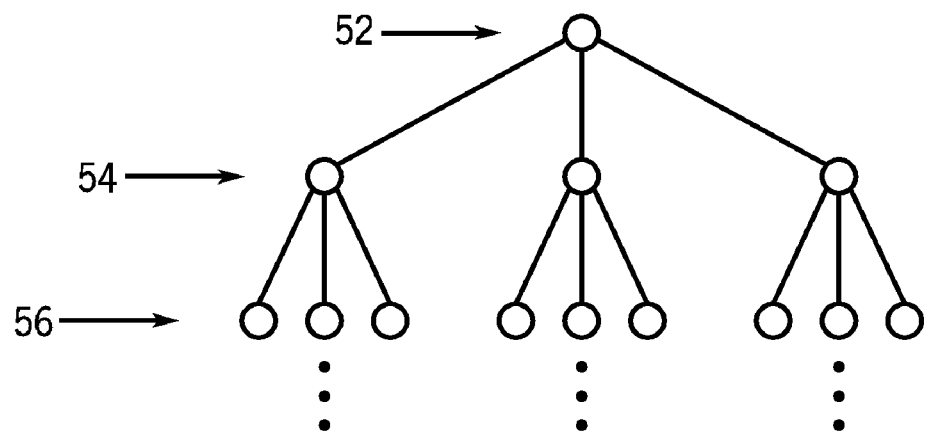
FIG. 5 is a diagrammatical representation of a hierarchical segmentation scheme that may be used for one or more images to be registered in accordance with the present technique.

FIG. 5 represents an overall scheme for the hierarchical segmentation of images into the levels described above. In general, the scheme may be thought of as subdividing the image into levels with each subsequent level being itself subdivided. Thus, the original registration image may be represented by a node 52. This node is in turn divided into two or more nodes 54. Although three such nodes or segments are illustrated in FIG. 5, as few as two elements or segments may be utilized, and many more than three may be employed. Similarly, at the next lower level 56 at least one of the segments or elements 54 is further subdivided.

It should be noted, that for images wherein all interest is directed towards a specific feature, only that feature may be segmented out at level 54. Subsequent levels may include sub-features of that feature. This may be the case, for example, in medical evaluation of the heart, lungs, liver, specific anatomies and organs, and so forth. Independent manipulation of that particular structure may be useful, with additional levels of segmentation being performed on that specific structure alone. It should also be noted that the present technique may be used for three dimensional images as well as two dimensional images, although for simplicity sake only two dimensional images are illustrated in the present discussion. Such three dimensional images may be made on many different modality imaging systems, including magnetic resonance imaging systems, computer tomography systems, ultrasound systems, and so forth. In such case, segmentation essentially identical to that described above will be performed on three dimensional data allowing for translation and rotation in three dimensions, and scaling in one, two or three dimensions, simultaneously or independently.

Figure 6:
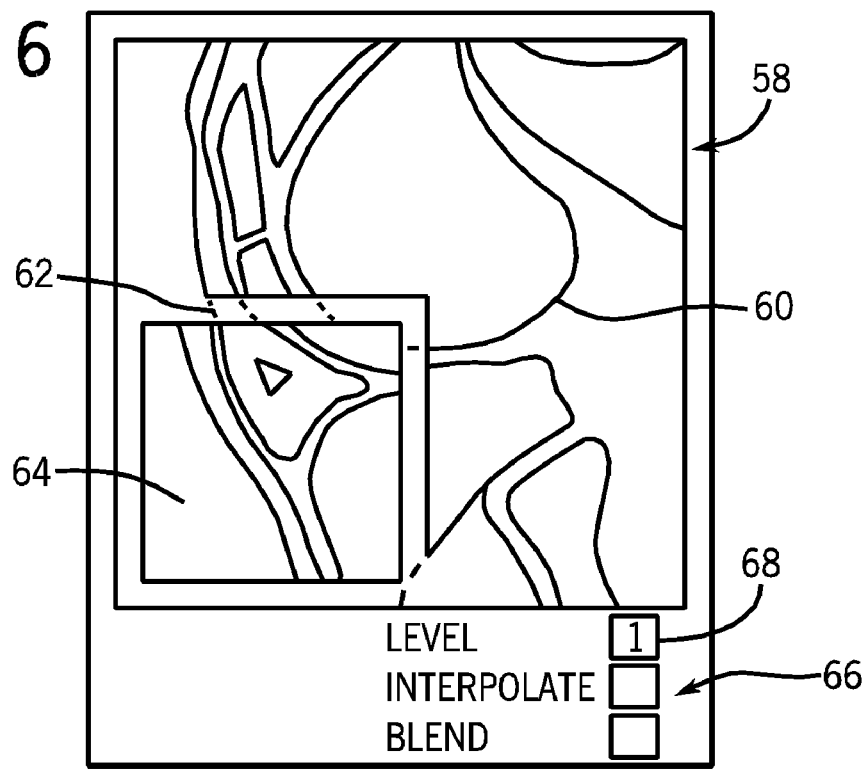
FIG. 6 is a simplified line diagram of a medical image in which interactive alignment is preceding at a first hierarchical level.
Figure 7:
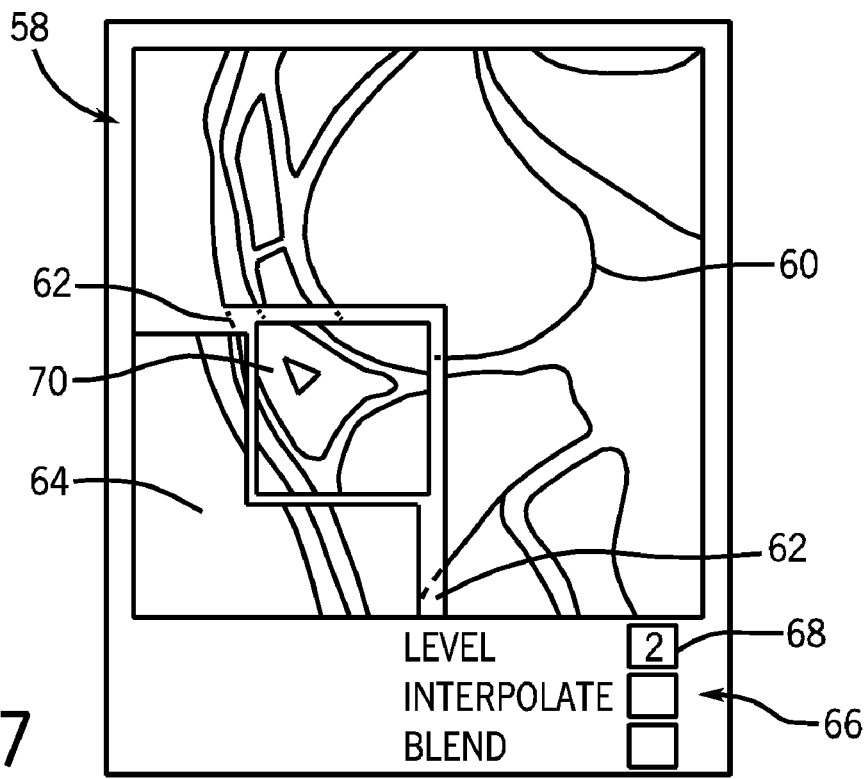
FIG. 7 is a similar line diagram of the same image in which alignment is preceding at a further hierarchical level.
Figure 8:
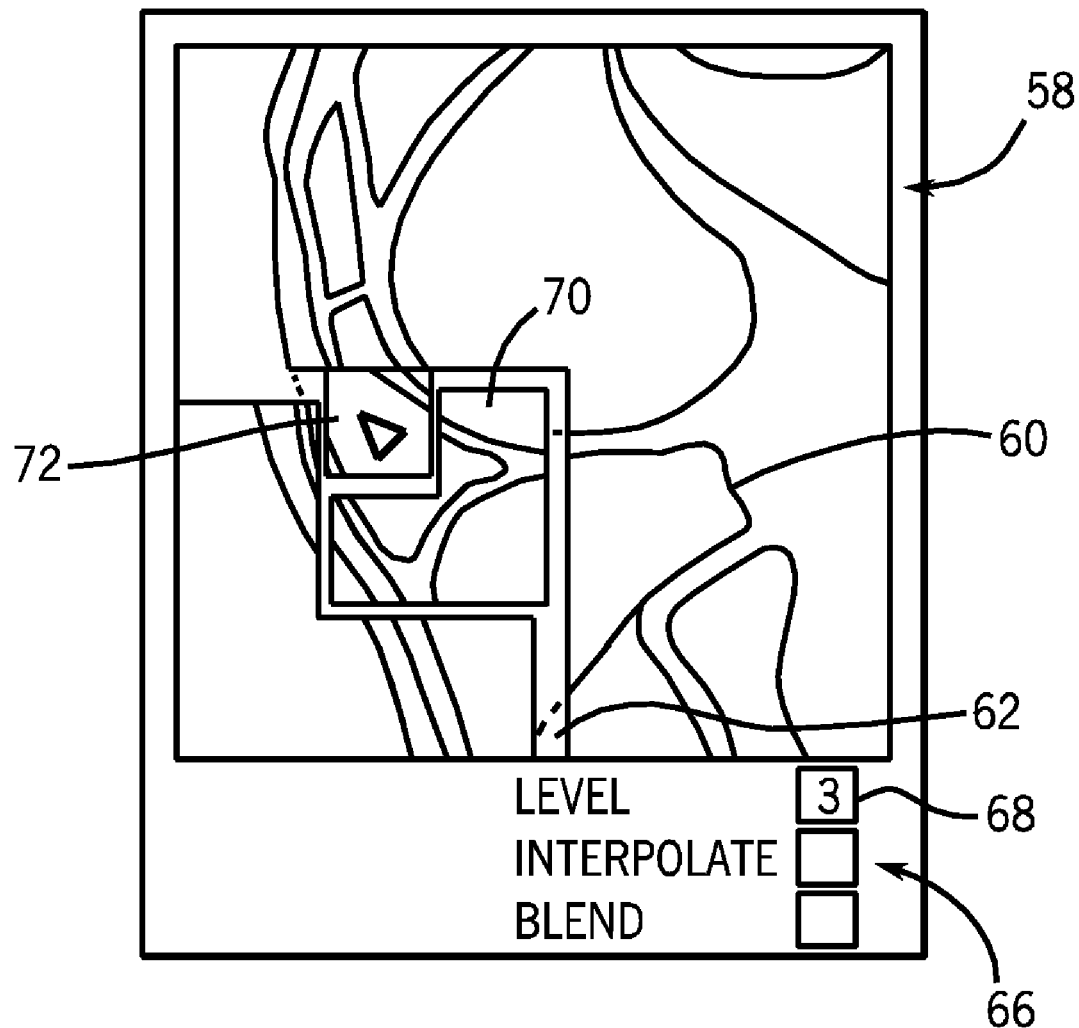
FIG. 8 is a line diagram of the same image with interactive registration taking place at a further level.

By way of example, FIGS. 6, 7 and 8 illustrate the manipulation of a registration image overlaid on a reference image in a medical diagnostic context. In the illustrated example the images are saggital digital X-ray images of the human knee. As will be appreciated by those skilled in the art, such images will comprise a matrix of pixels with greater or lesser degrees of intensity of brightness depending upon the absorption or attenuation of X-ray radiation by the intervening tissues between the X-ray source and the detector. Tissues in a typical X-ray image through human tissues will allow visualization of soft tissues (skin, fat, muscle) and bone and cartilage. Because the reference image and the registration image may not be properly aligned, such registration is extremely useful. Again, the registration may be made to superimpose the registration image on an atlas or general reference image, or on images made of different patients. Where changes in anatomy are anticipate over time (due to the progression of a disease state or growth or the response to a disease state to treatment), comparisons may be made between images of the same patient and anatomies at different times. Again, although the specific example is of an X-ray image made in the medical diagnostics context, the technique may be applied to any digital image made by any modality and of any subject or article of interest.

As illustrated in FIG. 6, the registration image 58 is viewed in a computer screen that is defined by the graphical user interface and application software running on the workstation described above. In this case because the images of a knee, the anatomical features, such as bone and soft tissue will be visible in the image as indicated generally by reference numeral 60. The reference image, visible behind the registration image is generally indicated by reference numeral 62. Many different visualization techniques may be used for this purpose, including graying or ghosting of the reference image or registration image, combining of the images, opaque overlaying of the images, or any combination of such visualization techniques. In general, the application will be most useful if it allows the user to at least temporarily see both the reference image and the registration image. However, some or complete opacity of either image may be useful during the manipulation stage to permit proper alignment of the elements of the registration image with similar features of the referenced image.

In the image shown in FIG. 6, an element 64 at a first level of segmentation has been displaced from the remainder of the registration image. Such displacement will typically be made by the user moving a cursor or other graphical tool over the element or a specific point on the element to select the element. Thereafter, the element may be displaced by dragging and dropping the element in the desired location. Similar intuitive tools may be used for scaling and rotating the element. Once rotated or scaled, the element may be further translated. In general, the element may be manipulated and displaced to move it away from, towards, into or generally repositioned and scale the element with respect both to the remainder of the registration image and the reference image. The graphical user interface will typically include one or more tools for facilitating selection and visualization, as well as for proceeding through the process of registration. Such tools may be simple or complex and may include a wide range of functions. In a straightforward version illustrated in FIG. 6, for example, the interface includes navigation and control tools 66 allowing the user to select a level of segmentation (in this case a level one has been selected) control interpolation between the moved element and the remainder of the registration image, blending of images, and so forth. Other tools may include, by way of example, the ability to move forward and back the registration and segmentation images, scaling or windowing for the relative transparency or opacity of either of the images, and so forth.

FIG. 7 similarly illustrates movement of a sub-portion of element 64 in the image shown in FIG. 6. Thus, in the same graphical user interface, the same image 58 is overlaid over an image 62 which is the reference image. Here, however, a second level of segmentation has been selected as indicated by reference numeral 68. Thus, a smaller element 70 is available for selection by the user. Once selected, this element may be translated, rotated and scaled as described above, with the user generally moving the element to correspond to neighboring or similar features in the reference image, the registration image, or both. FIG. 8 represents a similar manipulation at a third level of segmentation. Here, the element 70 has been further segmented to make available a smaller element 72 which may be moved and manipulated by the user by a similar selection, translation, rotation and scaling.

Figure 9:
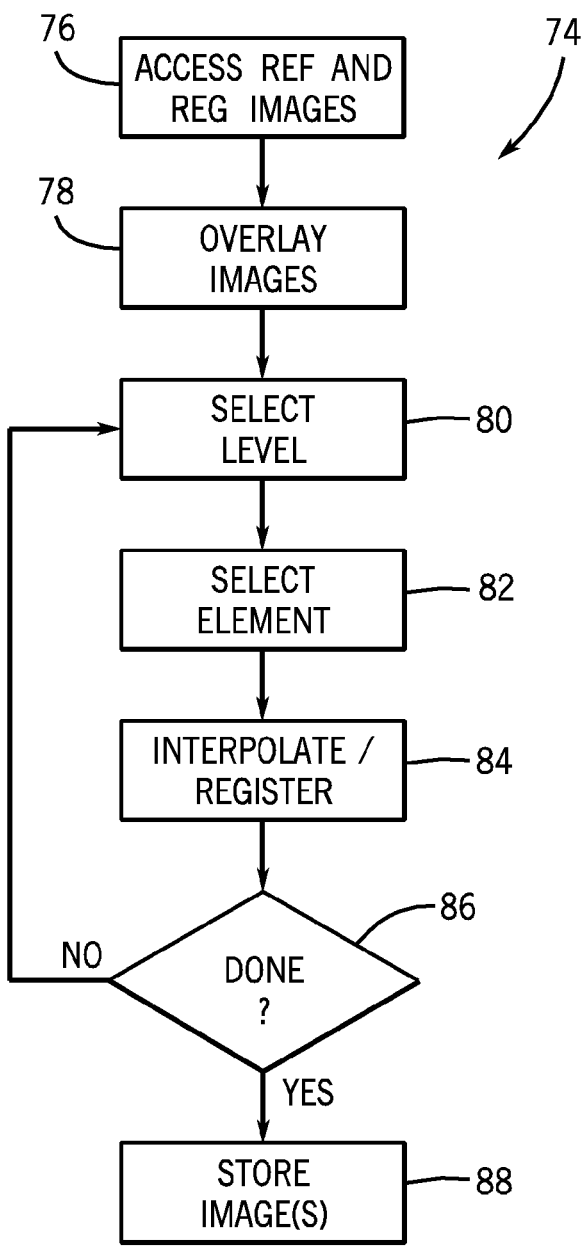
FIG. 9 is a flow chart illustrating exemplary logic for performing interactive registration of images based upon a hierarchical segmentation.

FIG. 9 summarizes exemplary steps in logic for performing the interactive, hierarchical segmentation-based registration described above. The process, designated generally by reference numeral 74 in FIG. 9, begins with accessing the reference and registration images as indicated at step 76. Again, these images were typically be stored on image tour devices, libraries, subscription services (in the case of standard atlas images) and so forth. The images are downloaded or otherwise load onto a workstation at which the user will manipulate at least the registration image. At step 78 the images are overlaid using any suitable graphical tools. At this stage, the reference image may be placed behind the registration image, for example, and the registration image may be rotated, translated, scaled or otherwise generally aligned with the reference image.

At step 80, then, if the user is unsatisfied in any way with the registration of the images, the user may opt to perform hierarchical manual registration. To begin this process, the user will select a segmentation level. As indicated with reference to FIGS. 6, 7 and 8 above, the selected level will make available certain segmented portions or elements of the registration image for selection and manipulation by the user. At step 82, the user will select a desired element or a group of elements. This is typically performed by placing a cursor over a desired element and selecting the element which is highlighted, shown with a border or otherwise graphically designated for feedback to the user as selected. At step 84, the user may register the image element by translation, rotation and scaling, placing the selected element in a desired situation and at a desired size with respect to either the reference image, the remainder of the registration image, or both. Step 84 also indicates that interpolation may be performed. This interpolation may affectively shown the moved or scaled element with surrounding portions of the registration image in a seamless manner to more closely match the reference image. At step 86, if the interactive registration is complete, the manipulated registration image may be stored as indicated at step 88. That is, at step 86, the user will typically made a visual judgment as to whether the registration is now satisfactory, or whether additional adjustments may help improve the appearance of the registration. It should be noted that in addition to storing of the changed registration image, composite images may be stored, such as images that combine features of the registration image and the reference image. Further operations may be performed as well, including analysis, comparison, quantitative and qualitative measurement, and so froth of differences between the registered registration image and the reference image, such as for measurement of changes in features of interest overtime. If at step 86 further manipulation of the registration images desired, the user may return to step 80, select a different level and continue with the interactive registration process.

Although the steps outlined in FIG. 9 and described above relates to segmentation, interactive registration, and interpolation, it should be noted that the present techniques do not exclude the use of other segmentation, registration, and image alignment processes. For example, the hierarchical segmentation interactive registration approach described above may be used in conjunction with conventional registration processes, either before, after or iteratively with such processes. By way of example, a user may manipulate a registration image to satisfactorily align the image with a reference image, and then have conventional registration calculations made, such as based upon warping, splines, and so forth. Alternatively, such conventional methods may be used first, but the interactive approach used secondarily to obtain a more intuitively comparable or visually satisfactory registration and comparison.

Figure 10:
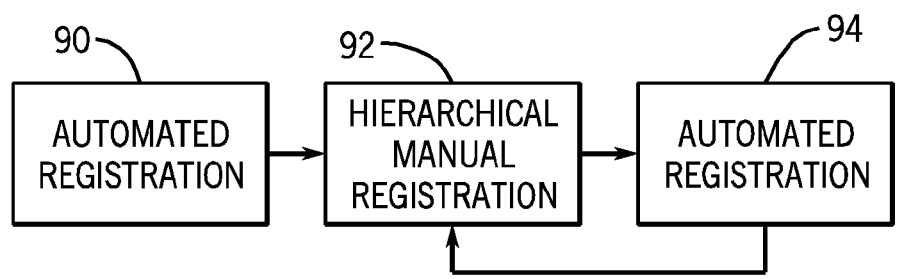
FIG. 10 is a diagrammatical representation of how the invention may be implemented with the use of both automated and manual hierarchical registration techniques.

FIG. 10 generally represents this type of processing. As shown, some type of automated (or semi-automated) registration may be employed, as indicated by reference numeral 90, prior to hierarchical manual registration, designated by reference numeral 92. In general, this will be the case, with the images being superimposed or otherwise aligned to permit the user to determine whether the registration is satisfactory. This initial assessment will typically visual only, although computed indicators of registration quality may be used as well. If the user determines that one or more parts of the image need to be adjusted to improve the registration, then, the user may proceed through one or more levels of hierarchical manual registration, and align one or more elements at each level, as described above. Thereafter, the user may return to the same registration technique employed earlier, or may advance to another automated technique, as indicated by reference numeral 94. It should be noted that the automated techniques need not be the same, and several such techniques may, in fact, complement one another. At any stage, the user may revert to overriding any part of the registration by performing the manual registration.

The present invention provides utility and technical effects insomuch as it permits the registration of two or more images in two or more dimensions by user interaction. In particular, the invention offers substantial utility and the ability to more satisfactorily align a registration image with a reference image by breaking the registration image into user-manipulable elements that can individually be translated, rotated and scaled.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for registering a digital image with a reference, comprising:
   (a) accessing a reference image and a registration image, the registration image being segmented into at least 2 hierarchical levels of segmentation elements, wherein each segmentation element of a preceding level is spatially subdivided into segmentation elements of a subsequent level;
   (b) receiving a user selection of a segmentation level;
   (c) displaying at least one segmented element of the reference image in accordance with the selected segmentation level;
   (d) receiving a user selection of a segmented element at the selected level;
   (e) receiving user input for alteration of the registration image by modification of the selected element; and
   (f) storing the altered registration image including the modified selected element.

2. The method of claim 1, comprising performing an initial registration of the reference and registration images.

3. The method of claim 2, comprising performing an initial assessment of the relative quality of the initial registration.

4. The method of claim 3, wherein the initial assessment is a visual assessment by the user.

5. The method of claim 1, wherein the reference and registration images are two dimensional images.

6. The method of claim 1, wherein the user input includes translation, rotation or scaling of the selected segmented element.

7. The method of claim 1, including repeating steps (d), and (e) for different elements at the selected segmentation level.

8. The method of claim 7, comprising storing the segmented image.

9. The method of claim 1, including repeating steps (b), (d), and (e) for different segmentation levels and for at least one segmented element at each selected segmentation level.

10. The method of claim 1, comprising interpolating pixel values between the modified segmented element and a remainder of the registration image.

11. The method of claim 1, comprising superimposing the registration image on the reference image in a manner that permits visualization of the registration image and at least a portion of the reference image during steps (b), (c), and (d).

12. The method of claim 1, comprising performing a hierarchical segmentation process on the registration image after step (a).

13. The method of claim 1, wherein the registration image is segmented independently of features of interest visible in the registration image.

14. The method of claim 1, comprising storing a composite image including the reference image and the altered registration image.

15. A method for registering a digital image with a reference, comprising:
 (a) accessing a reference image and a registration image, the registration image being segmented into at least 2 hierarchical levels of segmentation elements, wherein each segmentation element of a preceding level is spatially subdivided into segmentation elements of a subsequent level;
 (b) receiving a user selection of a segmentation level;
 (c) displaying at least one segmented element of the reference image in accordance with the selected segmentation level;
 (d) receiving a user selection of a segmented element at the selected level;
 (e) receiving user input for alteration of the registration image by translation, rotation or scaling of the selected element, the user being able to perform any or all of translation, rotation and scaling of the selected element;
 (f) repeating steps (b) through (e) for different segmentation levels; and
 (g) storing the altered registration image including the modified selected element.

16. The method of claim 15, including repeating steps (d), and (e) for different elements at a selected segmentation level.

17. The method of claim 15, comprising interpolating pixel values between translated, rotated or scaled segmented element and a remainder of the registration image.

18. The method of claim 15, comprising superimposing the registration image on the reference image in a manner that permits visualization of the registration image and at least a portion of the reference image during steps (b), (c), and (d).

19. The method of claim 15, comprising performing a hierarchical segmentation process on the registration image after step (a).

20. The method of claim 19, comprising storing the segmented image.

21. The method of claim 15, wherein the registration image is segmented independently of features of interest visible in the registration image.

22. The method of claim 15, comprising storing a composite image including the reference image and the altered registration image.

23. A system for registering a digital image with a reference, comprising:
 a digital storage device for storing a reference image and a registration image, the registration image being segmented into at least 2 hierarchical levels of segmentation elements, wherein each segmentation element of a preceding level is spatially subdivided into segmentation elements of a subsequent level;
 processing circuitry configured to access the reference and registration images, to receive a user selection of a segmentation level, a user selection of a segmented element at the selected level, and user inputs for alteration of the registration image by modification of the selected element, the processing circuitry altering the registration image based upon user modification of the selected element at the selected level; and
 a display device coupled to the processing circuitry and configured to display the reference image, the registration image, the selected element at the selected segmentation level, and the altered registration image as the user inputs are made.

24. The system of claim 23, wherein the processing circuitry provides a graphical user interface for selection of the segmentation level and the user selected element, and for translation, rotation and scaling of the user selected element.

25. The system of claim 23, wherein the processing circuitry is configured to perform interpolation between the modified selected element and a remainder of the registration image.

26. The system of claim 23, wherein the processing circuitry is configured to perform a hierarchical segmentation on the registration image.

* * * * *